April 5, 1960    J. A. MELCHORE    2,931,793
PROCESS FOR PREPARING THERMOPLASTIC POLYMERS
Filed March 30, 1956
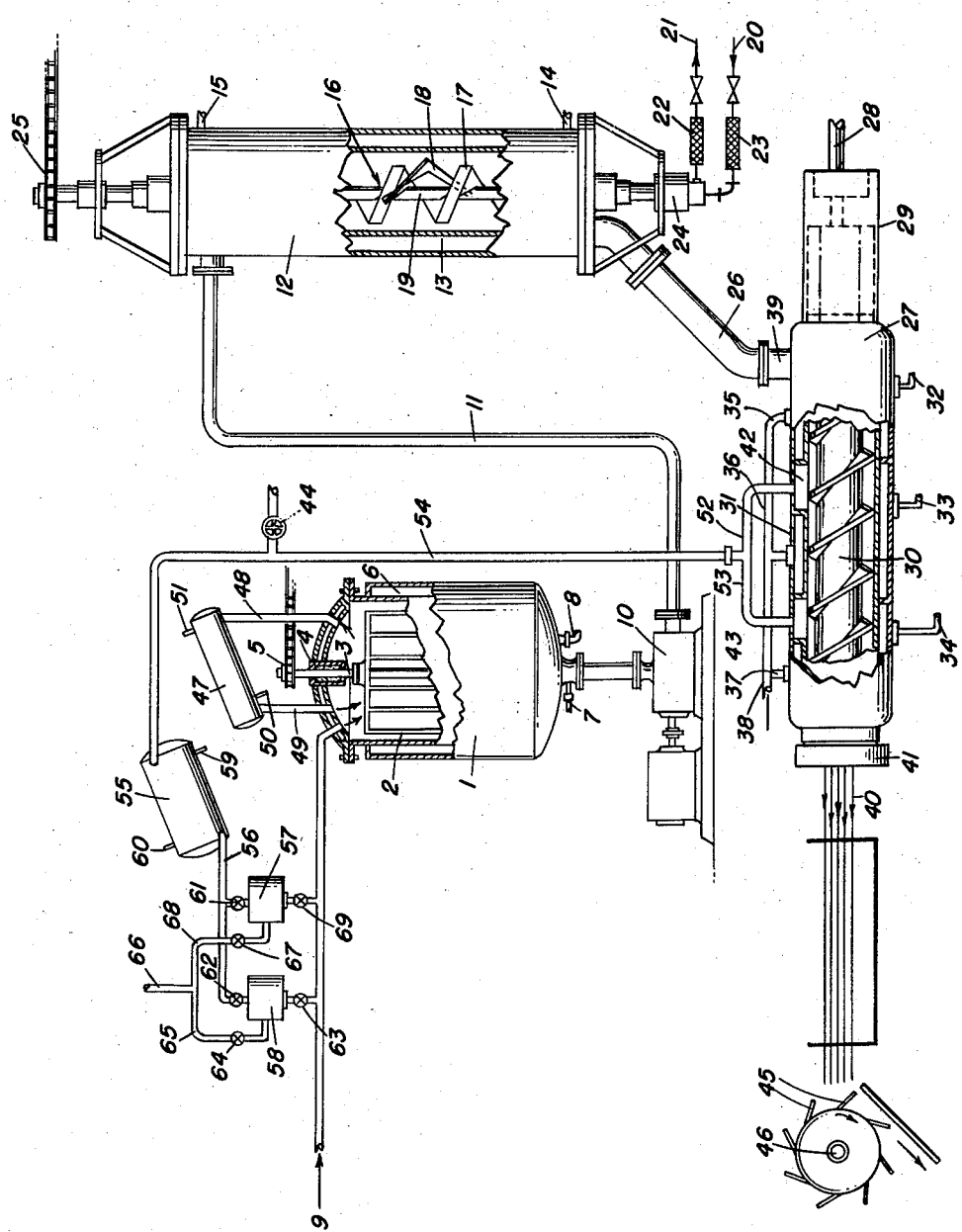
INVENTOR.
JAMES A. MELCHORE
BY
Arthur J. Santamura
ATTORNEY.

United States Patent Office 2,931,793
Patented Apr. 5, 1960

2,931,793

PROCESS FOR PREPARING THERMOPLASTIC POLYMERS

James A. Melchore, Darien, Conn., assignor to American Cyanamid Company, New York, N.Y., a corporation of Maine Application March 30, 1956, Serial No. 575,164

10 Claims. (Cl. 260—93.5)

This invention relates to the polymerization of styrene-type compounds. More particularly, this invention relates to the polymerization of styrene compounds whereby the product produced consists of greater than 98% polymeric material and is obtained without the employment of complicated processing apparatus.

It is well known that polymers of styrene compounds find many uses as molded articles, which may be formed by such conventional methods as compression or injection molding, also the molded articles are transparent and possess good flexural and tensile strength, as well as good electrical properties. Polymers of styrene compounds, particularly the ring-substituted alkyl styrene polymers possess increased strength and heat, chemical and abrasion resistances. In the polymerization of styrene-type compounds, it is generally difficult to obtain a good product when monomers of comparatively low purity, i.e., as low as 50%, are polymerized by conventional methods due to the low heat resistance and crazing tendencies resulting from the presence of the non-polymerizable impurities. Examples of impurities present in the monomers are such as ethylbenzene in styrene and ethyltoluene in methylstyrene. Furthermore, when it is attempted to remove unreacted monomers from polymers of styrene compounds by known methods, the polymer discolors at the high temperature involved.

The important advantages derived from the invention are polymerization of low purity monomers, ease of operation, continuous processing, and provision for elimination of uncontrollable heat of reaction. By the invention, it is possible to obtain transparent polymers from styrene-type compounds, which have good color and contain less than 2% methanol extractables and generally less than 1% methanol extractables. Methanol extractables will be understood as that amount of material which may be removed from the polymer by dissolving the polymer in solvent, such as benzene, toluene, dioxane, and the like, pouring the resulting solution into methanol and filtering off the precipitate. The difference in the weight of the original polymer and the precipitated polymer is known as methanol extractables.

According to the invention, these high polymer content homopolymers may be obtained by employing relatively simple processing apparatus and using a technique whereby it is possible to employ a continuous operation. Furthermore, as previously mentioned, it is not necessary that monomers of high purity be employed, as good results are obtained, even with low purity monomers. Another advantage of the present invention is the provision of a shortened polymerization cycle. According to the invention, polymers of styrene-type compounds may be obtained, if desired, without the necessity of a catalyst.

In the polymerization of styrene-type compounds, polymerization is initiated in a pot or still wherein the monomer is agitated. The temperature within the prebodying heat pot is maintained at temperatures of from about 80° C. to 130° C. and agitation of the mix by paddles or any other conventional apparatus is necessary to control the exothermic heat of reaction. Since the polymerization is an exothermic reaction, it is necessary to dissipate the heat evolved; otherwise hot spots in the reaction frequently develop which are detrimental to the product and runaway temperatures as high as 200° C. or more are likely to result. These runaway temperatures are to be avoided, not only because of the danger of explosion from the excessively high temperatures, but also because dimers, trimers, and other objectionable low molecular weight polymers are formed. Furthermore, the polymerization cannot be carried to completion in the prebody pot because, as polymerization progresses, the mix becomes increasingly more viscous, so viscous that a point is ultimately reached where even the sturdiest stirring apparatus would be ineffective. Also unless elaborate heat exchange equipment for the thermal regulation of the charge is employed, the reaction will reach the runaway temperatures and danger stage above mentioned.

In the prior art, various methods have been employed to obtain substantial completion of the polymerization reaction. One method is to prepolymerize the compound, such as styrene, to approximately 35% conversion. The partially polymerized mix is then introduced into a polymerization tube wherein elaborate heat exchange equipment is employed to regulate the exothermic heat of reaction. The partially polymerized mix is maintained in the polymerization tube for upwards of 50 hours at temperatures varying from 120° C. to 200° C. A product of about 95% conversion may be obtained, which may then at this high conversion be vacuum-treated to effect removal of the unreacted monomeric material.

Another method employed in the prior art is to prebody the material at approximately 125° C. to from 70% to 80% conversion. Elaborate stirring mechanism is required to agitate the viscous mix and avoid the undesirable runaway temperatures as the polymerization progresses and the heat transfer of the polymerizate falls off sharply, particularly beyond 60% conversion. From the prebody still the mix is introduced into a polymerizer tube for a period of hours where elaborate heat exchange equipment is required to control the temperature of polymerization. In the polymerization tube conversion of substantially 95% is possible. It is then usual for the polymerization mix to be milled to remove unreacted monomers.

It is an object of the present invention to obtain polymers of styrene-type compounds having a purity better than 98% without the utilization of elaborate polymerization equipment. It is a further object of this invention to eliminate the danger of runaway temperatures present during the polymerization reaction by preventing further polymerization during this critical stage of the reaction. It is another object of the invention to provide a process for polymerizing styrene-type monomers which need not be of high purity. These and other objects of the invention will be discussed more fully hereinbelow.

The styrene compounds included within the process definition of my invention are those compounds represented by the following formula:

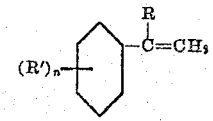

wherein "R" is selected from the group consisting of hydrogen, chlorine, and a methyl radical, "R'" is a substituent selected from the group consisting of hydrogen, chlorine, lower alkyl, lower alkoxy and cyclohexyl radicals, and "n" is an integer from 0 and 2. Among such compounds are styrene per se, nuclear-substituted alkyl styrenes, e.g., o-, m-, and p-methyl styrene, 2,4-dimethyl styrene, p-tertiary butyl styrene, and the like; alkoxy styrenes, such as p-methoxy styrene; ring-substituted styrenes, such as p-cyclohexyl styrene; nuclear-substituted halo styrene, e.g., chlorostyrene, 2,4-dichlorostyrene, 2,5-dichlorostyrene, and the like; side chain alkyl and halo-substituted styrenes, e.g., alpha-chlorostyrene, and the like. Mixtures of the styrene compounds may also be employed if desired, e.g., a mixture of methylstyrene and α-methylstyrene.

If desired, a conventional polymerization catalyst, such as benzoyl peroxide, in an amount from about 0.02% to about 2% by weight, based on the monomers charged into the reactor may be employed. Other conventional catalysts which may be used are such as tertiary butyl hydroperoxide, tertiary butyl perbenzoate, ditertiary butyl peroxide, lauroyl peroxide, and the like. Mixtures of the various catalysts may also be employed. However, the use of a catalyst is not necessary to insure polymerization when the process of the present invention is employed.

According to the invention, a conventional prebody pot is initially employed. A charge of the monomeric compound to be polymerized, such as methylstyrene, is placed in the pot. Polymerization is initiated at temperatures from 85° C. to 110° C. Agitation of the mix is accomplished by conventional paddles or stirrers. After a period of from about 4 to 24 hours in the prebody pot, the mix may reach a conversion of up to about 65%, a condition wherein the polymer, although viscous, may still be agitated to a practical extent. While it is possible to carry the conversion further in the prebody pot, it is not desirable nor generally economical, since the viscosity of the mix is such that agitation thereof becomes increasingly difficult with the usual equipment. From this point on in the conversion of the monomers, the danger of the runaway temperatures with consequent formation of undesirable low molecular weight products is most apparent. As indicated, the prebody conversion may be carried to as high as, and upward of 65% and the polymer may thereafter be introduced into a devolatilizer-extruder wherein the purity of the polymer is increased to about 99% by removal of the unreacted monomers. It is preferred, however, that the monomeric material be prebodied from about 20% to about 45% conversion in the prebody pot and thereafter the prebodied polymer is passed into a thermoscrew zone wherein the polymer conversion is carried up to about 70%, but preferably not in excess of 65% conversion. The polymerization effected up to the time the material is introduced into the devolatilizer-extruder comprises the entire polymerization of the material according to the procedure of the invention. The termination of the polymerization at this relatively low conversion is an important feature of the invention.

The material may be introduced directly from the prebody pot into the devolatilizer-extruder. Preferably, however, the monomer is polymerized more economically and to better advantage in two stages, i.e., prebody pot to below about 45% conversion and thermoscrew to below about 70% conversion in that order. The mixture containing approximately up to about 70% solids, i.e., the point at which the polymerization reaction, according to the invention, is completed, is thereafter introduced into a twin screw compounding devolatilizer-extruder. The devolatilizer-extruder is sectionally heated from temperatures of about 110° C. to about 225° C. and is maintained under vacuum at an absolute pressure of from about 5 to 200 mm. mercury. Preferably, the temperature of the sectionally heated devolatilizer-extruder is maintained at from about 160° C. to about 200° C. and the vacuum is preferably maintained at from about 30 to about 110 mm. mercury absolute pressure. As the partially polymerized mix from the thermoscrew is introduced into the devolatilizer-extruder, the increased temperature and heat supplied by working the polymer with the twin screws of the devolatilizer-extruder causes a volatilization of the volatile ingredients from the partially polymerized material in the thermoscrew zone and at the same time, because the extruder is maintained at subatmospheric pressures, the unreacted monomer and other volatile material is withdrawn or devolatilized from the polymer-containing material. It is in this operation that the purity of the polymer is carried to 98% and higher.

The treatment in the devolatilizer-extruder is highly advantageous in view of the fact that organic material, such as unreacted monomer from the extruder-devolatilizer, is dependent upon the rate of diffusion from the polymeric material, and this removal is ordinarily a very slow process, particularly with viscous styrene-type polymers having relatively large cross-sections. According to the devolatilization-extrusion step of the process of the invention, the polymer-monomer mixture is worked in the under vacuum such that new surfaces are continuously and rapidly being presented to the vacuum sections, thereby removing non-polymerizable compounds and/or the unpolymerized polymerizable monomer from the mixture. By this technique, the rate of diffusion is so improved that substantially 100% of the non-polymer material is removed from the residual polymer and a practical and novel process is provided.

The total contact time of the material introduced into the devolatilizer-extruder which has a polymer content not in excess of about 70%, to produce a material of greater than 98% and generally better than 99% polymer is less than about 5 minutes and ordinarily from about 1 to about 3 minutes. It will be noted that the devolatilizer-extruder is not used to advance the polymerization reaction but is used for removal of unreacted materials, both non-polymerizable compounds and polymerizable non-polymerized compounds, from the mixture. By simultaneously extruding and devolatilizing the partially polymerized mixture obtained from the thermoscrew zone, the danger of runaway temperatures at the most critical period caused by the exothermic heat of the reaction as the polymer conversion increases upwards from about 25% conversion accompanied by sharply increasing viscosity, is again avoided. In the present invention this can be accomplished, even though the heat transfer of styrene-type polymers is in the order of 0.07 B.t.u./ft.$^2$/° F./hr./ft. and the dissipation of heat particularly in cross-sections in excess of two inches from the highly viscous reacting mass becomes increasingly difficult as converion increases, even with agitation.

It will be apparent that the process of the invention, by providing good working of the material, even at high viscosities, and by providing excellent heat dissipating surfaces for the needs required, in all stages of the process, results in a highly advantageous polymerization procedure.

The unreacted monomeric compound that is removed from the charge in the devolatilization-extruder may be recycled to the prebody pot. In the case of impure monomers, the material volatilized may be bled off in whole or in part and the part removed from the system may be employed as a by-product. Monomers of as low as 50% purity may be polymerized. It is preferred, however, that the volatilized material which is recycled in the continuous process be adjusted so as to attain a constant state of feed to maintain the polymerizable monomer material at a purity of about 90% monomer. This may necessitate the bleeding of a portion from the recycled material withdrawn from the devolatilizer-extruder, the amount depending on the original purity of the monomer. In the case of lower purity monomer starting material, the material volatilized may preferably be purified as by distillation and the monomer recovered and reintroduced into the system.

The overall time required for producing a substantially pure polymer (i.e., better than 98% purity) by the instant process is greatly reduced and the ultimate cost, convenience and broad range of applicability to monomers of varying purity make the invention highly desirable.

The invention will be better understood by reference to the single figure of the drawing shown partially in section which will aid in disclosing the procedure utilized in the process. By way of illustration only, the polymerizing of methylstyrene will be disclosed, it being understood that other styrene-type compounds may be employed equally well in my process.

Referring more particularly to the drawing, 1 is the prebody pot equipped with a rotatable cage or stirrer 2 connected to the shaft 3, passing through bushing 4 in the top of the pot and driven by sprocket 5 connected to a motor not shown. The pot is conventionally heated, as shown by the jacket 6. The heating fluid, such as oil or other suitable material, circulates into the jacket at connection 7 and exits through pipe 8. Methylstyrene monomer is introduced into the pot under pressure through line 9. As the monomer enters the heated pot maintained at a temperature of from 85° C. to 110° C., the rotating cage 2 agitates the monomer as it polymerizes up to about 60%, but preferably below 45% conversion, which occurs in a period of from 6 to 24 hours. The partially polymerized charge from this first stage is then pumped at 10, although it may be forced by the pressure applied from the charge and/or by gravity through the bottom of the pot through the line 11 either directly into the feed hopper 39 of the devolatilizer-extruder (by a line not shown) or as shown, it enters a second polymerization zone or stage, referred to hereinafter as the thermoscrew zone 12, which comprises a vessel having a jacket 13 through which cooling fluid is circulated. The coolant for the jacket enters the jacket at 14 and exits at 15. The thermoscrew zone is equipped with a hollow-flight thermoscrew 16, so called because the blade or flight 17 is hollow, permitting the circulation of cooling fluid therethrough. To assure more thorough mixing of the polymerizing material, the thermoscrew may be equipped with a reverse flight 18, i.e., a blade attached at the periphery of the screw-flight 17 but spiralling in a direction reversed to that of the thermoscrew flight. Fluid for controlling the temperature in the thermoscrew zone may circulate through various routes. As shown, the coolant enters the shaft 19 of the thermoscrew at 20 and cascades through the hollow flight 17 and exits at 21. It is apparent that the path of the coolant may be reversed. Flexible couplings for connecting the coolant lines to the source are shown at 22 and 23. The coupling at 24 for the thermoscrew shaft and coolant connection may be constructed and arranged in a conventional manner. The thermoscrew 16 may be rotated in conventional manner through the sprocket 25 by driving means not shown.

It will be apparent that the partially polymerized material may be introduced directly from the prebody pot 1 into the devolatilizer-extruder feed hopper 39, although for economical and practical reasons, it is preferred to polymerize the prebodied material in a second stage, i.e., in the thermoscrew zone 12 before introducing the partially polymerized material into the devolatilizer-extruder 27.

The material polymerized up to about 70% conversion is taken from the bottom of the thermoscrew zone through the conduit 26 into the twin screw devolatilizer-extruder 27. The devolatilizer-extruder shaft 28 is connected to driving means not shown and extends into housing 29 which contains conventional gearing to cause screw 30 to rotate. In the drawing only one screw is disclosed, but it should be understood that the devolatilization-extruder 27 contains twin screws located adjacent one to another which are normally driven in opposing directions. Around the exterior of the devolatilization-extruder is a heating jacket divided into sections, as indicated by 31. Inlets 32, 33, and 34 allow a heating fluid to circulate in the heating jacket sections of the devolatilizer-extruder maintained at temperatures of from 160° C. to 225° C. The heating fluid is taken off from the heating jacket by connections 35, 36, and 37 connected to pipe 38, which returns the fluid to the heating unit not shown. The charge enters the twin screw extruder through the feed hopper 39 and the polymeric material shown in strands 40 is removed from the devolatilizer-extruder through die 41. The partially polymerized mass passes from the feed hopper 39 through the extruder wherein the volatiles released due to the elevated temperature and reduced pressure in the extruder are taken off through ports 42 and 43. The polymeric material passes out through die 41 in a period of from one to three minutes after entering the devolatilizer-extruder. The polymeric mass passing out through the die 41 may cut into pellets by the rotating blades attached to shaft 46 driven by a motor not shown. Condenser 47 is connected to the pot 1 by pipes 48 and 49. Any of the vaporous monomers in the upper portions of pot 1 may circulate through pipe 48 through the condenser 47 and return as a liquid to the pot through pipe 49. Pipes 50 and 51 are provided for the circulation of a conventional coolant around the condenser 47. As previously indicated, the volatile material in the twin devolatilizer-extruder is removed through ports 42 and 43 by pipes 52 and 53, respectively, which connect to pipe 54 through which part of the volatilized material may be bled, as shown at 44, in order to maintain a constant state of purity in the monomeric material being introduced at 9. Due to the vacuum applied at ports 42 and 43, the volatile material passes up through line 54 to condenser 55 wherein the volatile material is condensed and passes via line 56 to either reservoir 57 or 58. Connections 59 and 60 are provided for circulation of a conventional cooler around condenser 55. Valves 61 and 62 are provided to regulate the flow of the condensed monomers flowing from the condenser 55. When valve 62 is open, valve 61 is closed and vice versa. When valve 62 is open, the condensed monomers would, of course, flow into reservoir 58. Valve 63 is at this time closed. Valve 64 is at this time open, so that a vacuum is drawn through line 65 by a vacuum pump not shown, connected to line 66. The vacuum applied in line 66 is such that the system through the reservoir condenser and connecting pipes leading to ports 42 and 43 is from about 5 to 200 mm. and preferably in the range of from about 30 to 110 mm. mercury absolute pressure. When reservoir 58 becomes full of condensed liquid monomers, valve 61 is open and valve 62 is closed. Simultaneously therewith valve 67 is opened and valve 64 is closed, so that the vacuum applied to line 66 will then pass through line 68 to reservoir 57, the condenser 55, line 54 and ports 42 and 43. Valve 69 is closed when the liquid monomers are being drawn into reservoir 57. When reservoir 57 is being utilized to collect the liquid monomers flowing from condenser 55, valve 63 is opened so that the liquid monomers collected in reservoir 58 may flow into line 9 and be recirculated to pot 1. By the manipulation of valves 61, 62, 63, 64, 67, and 69, it is possible to employ either reservoir 57 or 58 for the collection of the condensed volatiles. When one of the reservoirs is being used to collect the condensate, the valve between the other reservoir and line 9 is opened so that the liquid styrene may recirculate to pot 1. Conventional bushings, connections, etc., are applied throughout the system.

By rapidly passing the polymerization mass through the extruder in a period of from about 1 to 3 minutes, I have found that elaborate heat exchange equipment is not necessary. The vacuum applied to the devolatilization zone of the extruder removes the volatile material released due to the increased temperature and work done in the extruder and a product of greater than 98% and generally better than 99% polymeric material is recovered from the extruder. By recycling the volatiles to the prebody pot, no material is lost in the process. An efficient economic process carried out with conventional non-elaborate heat exchange equipment is thus possible.

The invention provides a novel and advantageous process. It is particularly well suited for polymerizing monomer containing substantial amounts of impurity, frequently as high as 50%, which heretofore could not satisfactorily be polymerized with a satisfactory polymer of good purity.

The process of the invention is also distinctive in that polymerization to higher conversions is not required, and thus the danger of peak exotherm stages are avoided. This is particularly advantageous because of the difficulty in continuing polymerization at higher conversions. In the instant process, the purity of the polymer obtained from monomers having as low as 50 monomer is obtained by devolatilizing the unreacted material from the partially polymerized mass. In the case of these low purity materials, i.e., mixtures containing as low as 50% polymerizable monomer, it is possible to carry the polymerization of the polymerizable monomers present to about 100% conversion because, due to the impurities in the mixture, the viscosity, even at 100% conversion of the polymerizable monomer content, does not reach the high level of polymerizations using purer monomer mixtures. The non-polymerizable material is then removed from the polymerized material in the devolatilizer-extruder.

The following examples are set forth for purposes of illustrating the process of my invention to obtain a polymerized product containing a high yield of polymeric material by simultaneously extruding and devolatilizing a polymer containing charge. Any specific enumeration of details should not be interpreted as a limitation, except as expressed in the appended claims. Parts are parts by weight, unless otherwise expressed.

*Example 1*

650 parts of styrene are charged to a stainless steel kettle. The mass is heated at 110° C. (85 to 130) until the viscosity is about 80 poises (i.e., 35% to 40% conversion of monomer to polymer). Then the mass is fed in a continuous manner to a second mixing vessel wherein the viscosity is increased to approximately 2500 poises (i.e., 55% to 65% conversion). This latter equipment is a vertically mounted hollow flight screw conveyor which is especially designed to handle viscous solutions requiring good heat transfer. However, after this point, even with this equipment, it becomes economically undesirable to further convert the polymerizate because of reduced equipment size necessitated by poor polymer heat conductivity and the difficulty of controlling reaction conditions, as well as high power consumption. Accordingly, the polymerization is stopped at this stage where the process becomes economically and technically unattractive (i.e., up to about 70%, preferably 55% to 65% conversion). At this point the unreacted monomers are readily and completely removed from the partially polymerized material within 1 to 3 minutes by using a counter rotating twin screw devolatilizer-extruder. The extruder hereinbefore described has two vacuum (devolatilizing) zones, although one or more such zones may be employed, wherein the unreacted monomer is removed and is recovered for subsequent recycling to the initial polymerization kettle. The absolute pressure in these vacuum zones is 50 mm. mercury, although a vacuum of from about 5 to about 200 mm. may be utilized. The feed as it enters the feed hopper of the extruder under about 30 pounds of pressure, is at a temperature of 110° C., although a temperature within the range of about 80° C. to 150° C. may be employed. The temperature of the feed and first vacuum zone of the devolatilizer-extruder sections is maintained at 170° C. (should preferably be at least in the range of about 150° C. to 190° C.) with a product temperature of about 150° C. or at least in the range of about 150° C. to 185° C. Within a very short period (i.e., about 30 seconds but less than about 5 minutes) in the closed reheat zone of the devolatilizer-extruder, the temperature of the product is increased momentarily to about 240° C. (the temperature should preferably be in the range of 185° C. to 250° C.). In this second zone the residual monomer content of the product is reduced below 0.5%. The product is extruded through a multi-hole die and is cut into ⅛-inch pellets suitable for a molding compound. The color and clarity of the polymer are excellent, and the heat distortion temperature due to very low residual volatiles in the polymer is exceptionally high, being about 90° C. and greater.

*Example 2*

650 pounds of methylstyrene containing 65% para isomer, 33% ortho isomer, and 2% meta isomer, and having a purity of 99.5% are treated according to the procedure of Example 1. Residual monomer in polymerized product is 0.3%. The polymer has a heat distortion temperature of 95° C.

*Example 3*

650 parts of methylstyrene having the same isomeric composition as the monomer of Example 2 and having a purity of about 92% is reacted according to the procedure of Example 1. Residual monomer in polymer of 0.4% and the heat of distortion temperature is 95° C. With this monomer only a portion of the volatilized material is recycled in order to keep feed monomer at a steady state purity of about 90%.

*Example 4*

50 parts of methylstyrene containing 50 parts of impurities comprising mostly (i.e., about 49 parts) ethyl toluene and other impurities is polymerized to essentially 100% conversion giving a 50% polymer solution of polymethylstyrene in ethyl toluene, etc. This solution is then fed to the devolatilizer-extruder in the manner similar to that described in Example 1. A pure polymer is obtained from the devolatilizer-extruder. The ethyl toluene containing about 1% impurity is recovered as such for further usage.

With a monomer purity of 50%, it is possible to carry the polymer to 100% conversion because although fully polymerized, the polymer does not attain the extreme viscosity of relatively pure monomers, as there is only 50% polymer in the mixture.

*Example 5*

Using equal amounts and following the procedure of Example 1, 3-methoxystyrene monomer is polymerized. The polymer contains 0.5% residual monomer and has a heat distortion temperature of 114° C.

*Example 6*

Using 650 parts of p-tertiary butyl styrene monomer and following the procedure of Example 1, a polymer having a heat distortion temperature of 105° C. and less than 0.75% residual monomer is obtained.

*Example 7*

The procedure of Example 1 is followed, employing 650 parts of p-cyclohexylstyrene monomer. The polymer product has a heat distortion temperature of 109° C. and contains less than 0.6% residual monomer.

*Example 8*

650 parts of a methylstyrene (para isomer, 65%; meta isomer, 35%; and ortho isomer, 2%) and α-methylstyrene mixture (weight ratio of 4 to 1, respectively) is reacted according to the procedure employed in Example 1. A polymer product having less than 0.7% unreacted monomer and a heat distortion temperature of 105° C. is obtained.

In the procedure of the invention, the partially polymerized charge introduced into the devolatilizer-extruder contains preferably from about 40% to about 70% solids. By carrying the polymerization to this range in the prebody or in the prebody pot and thermoscrew combination treatment, a polymerization time of about 8 hours is usually sufficient. If desired, the polymerization time may be extended to about 24 hours when lower polymerization temperatures are utilized. When the partially polymerized charge containing from 40% to about 70% solids is removed from the thermoscrew zone, the polymer is in a condition of increasing viscosity and in a state where the control of exotherm becomes more difficult. It is at this point that the polymerizate is introduced into the devolatilizer-extruder wherein the active ingredients, i.e., unreacted monomers are instantaneously removed, thereby eliminating further polymerization and consequently avoiding the danger of runaway temperature, due to the exotherm. As heretofore mentioned, the time that the partially polymerized charge is maintained in the devolatilization-extruder is preferably from about 1 minute to about 3 minutes. By controlling, among other things, the speed of revolution of the screws, the screw design and the die through which the material is extruded, the optimum retention time of the material in the devolatilizer-extruder may be determined. Inasmuch as the charge is maintained under vacuum and at elevated temperature in the devolatilizer-extruder, the unreacted non-polymerized monomers and non-polymerizable compounds volatilize and are removed due to the subatmospheric pressure and temperature maintained. The overall time required to obtain a polymerized product of styrene-type compounds is thus greatly reduced. The polymerized product prepared in accordance with my invention is of good color, transparent, and contains greater than 98% polymeric material.

This application is a continuation-in-part of my copending application, Serial No. 360,720, filed June 10, 1953, now U.S. Patent 2,745,824.

It will be apparent that various modifications are possible within the scope of the instant invention, and any enumeration of specific details is not intended to limit the invention, except as defined in the appended claims.

I claim:

1. A process for producing a thermoplastic resinous material from monomers consisting of those represented by the general fromula

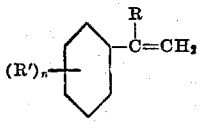

wherein "R" is selected from the group consisting of hydrogen, chlorine and methyl radicals, "R'" is a substituent selected from the group consisting of hydrogen, chlorine, lower alkyl, lower alkoxy and cyclohexyl radicals, and "n" is an integer from 0 and 2, which comprises reacting said monomers at a temperature of from about 85° C. to about 120° C. in two stages comprising (1) a prebodying stage wherein the polymerizable monomer is polymerized to an extent of from about 20% to about 45% by mixing and heating and (2) a thermoscrew stage wherein polymerization is advanced under heat and by mixing until a mixture polymerized to an extent not exceeding about 70% polymeric material is obtained; passing said partially polymerized mixture containing unreacted monomeric material through a devolatilizer-extruder maintained at a temperature of between about 110° C. and about 225° C. and at an absolute pressure of less than 200 mm. mercury in a period of less than about 5 minutes, while extruding the polymeric material and simultaneously devolatilizing the unreacted monomeric material therefrom; separately withdrawing the volatilized unreacted monomer material until a residual polymer of greater than 98% polymeric material is obtained by devolatilization; and extruding the residual polymeric material from the zone.

2. A process for continuously producing a thermoplastic resinous material from monomers consisting of those represented by the general formula

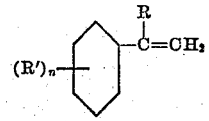

wherein "R" is selected from the group consisting of hydrogen, chlorine, and methyl radicals, "R'" is a substituent selected from the group consisting of hydrogen, chlorine, lower alkyl, lower alkoxy, and cyclohexyl radicals and "n" is an integer from 0 and 2, which comprises reacting said monomers at a temperature of from about 85° C. to about 120° C. in two stages comprising (1) a prebodying stage wherein the polymerizable monomer is polymerized to an extent of from about 20% to about 45% by mixing and heating and (2) a thermoscrew stage wherein polymerization is advanced under heat and by mixing until said material is polymerized to an extent not exceeding about 70% polymeric material, passing said partially polymerized material containing unreacted monomeric material through a devolatilizer-extruder zone maintained at a temperature between about 160° C. and 210° C. and at an absolute pressure of between about 30 and 110 mm. of mercury in a period of from 1 to 3 minutes while extruding the polymeric material and simultaneously devolatilizing the unreacted monomeric material and polymeric material from the zone until a residual monomer of greater than 98% polymeric material is obtained, and recycling unreacted monomeric material recovered from the zone to the bulk polymerization mixture.

3. A process for producing thermoplastic resinous material from a mixture containing from about 1% to 50% by weight of non-polymerizable material and from about 99% to about 50% by weight of polymerizable monomers consisting of those of the general formula

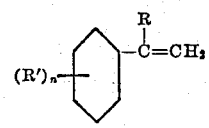

wherein "R" is selected from the group consisting of hydrogen, chlorine and methyl radicals, "R'" is a substituent selected from the group consisting of hydrogen, chlorine, lower alkyl, lower alkoxy, and cyclohexyl radicals, and "n" is an integer from 0 and 2, which comprises reacting said monomers at a temperature of from about 85° C. to about 120° C. in two stages, comprising (1) a prebodying stage wherein the polymerizable monomer is polymerized to an extent of from about 20% to 45% by mixing and heating and (2) a thermoscrew stage wherein polymerization is advanced under heat and by mixing until the polymerizable monomer in the mixture is polymerized and the polymer in the polymerized mixture comprises not more than 70% of the total mixture; thereafter passing said mixture containing non-polymerizable material through a devolatilizer-extruder maintained at a temperature of between about 110° C. and about 225° C. and at an absolute pressure of less than 200 mm. mercury in a period of less than about 5 minutes, while extruding the mixture and simultaneously devolatilizing the non-polymerizable material therefrom; separately withdrawing the non-polymerizable material until a residual polymer of greater than 98% polymeric material is obtained; and extruding the residual polymeric material from the zone.

4. A process for producing thermoplastic resinous material from a mixture containing from about 1% to 50% by weight of non-polymerizable material and from about 99% to about 50% by weight of polymerizable monomers consisting of those of the general formula

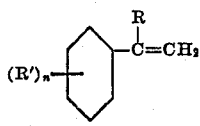

wherein "R" is selected from the group consisting of hydrogen, chlorine and methyl radicals, "R'" is a substituent selected from the group consisting of hydrogen, chlorine, lower alkyl, lower alkoxy, and cyclohexyl radicals, and "n" is an integer from 0 and 2, which comprises reacting said monomers at a temperature of from about 85° C. to about 120° C. in two stages, comprising (1) a prebodying stage wherein the polymerizable monomer is polymerized to an extent of from about 20% to 45% by mixing and heating and (2) a thermoscrew stage wherein polymerization is advanced under heat and by mixing until the polymerizable monomer in the mixture is polymerized and the polymer in the polymerized mixture comprises not more than 70% of the total mixture; thereafter passing said mixture containing non-polymerizable material through a devolatilizer-extruder maintained at a temperature of between about 110° C. and about 225° C. and at an absolute pressure of between 30 and 110 mm. mercury in a period of from about 1 to 3 minutes, while extruding the mixture and simultaneously devolatilizing the non-polymerizable material therefrom; separately withdrawing the non-polymerizable material until a residual polymer of greater than 98% polymeric material is obtained; and extruding the residual polymeric material from the zone.

5. A process for producing thermoplastic resinous material from a mixture containing up to about 30% by weight of non-polymerizable material and at least 70% by weight of polymerizable monomers consisting of those of the general formula

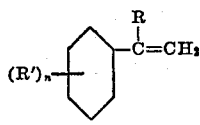

wherein "R" is selected from the group consisting of hydrogen, chlorine and methyl radicals, "R'" is a substituent selected from the group consisting of hydrogen, chlorine, lower alkyl, lower alkoxy, and cyclohexyl radicals and "n" is an integer from 0 and 2, which comprises reacting said monomers at a temperature of from about 85° C. to about 120° C. in two stages comprising (1) a prebodying stage wherein the polymerizable monomer is polymerized to an extent of from about 20% to about 45% by mixing and heating and (2) a thermoscrew stage until the polymerizable monomer in the mixture is polymerized and the polymer in the polymerized mixture comprises not more than 70% of the total mixture; passing said mixture containing about 30% non-polymerized material through a devolatilizer-extruder maintained at a temperature of between about 110° C. and about 225° C. and at an absolute pressure of less than 200 mm. mercury in a period of less than about 5 minutes, while extruding the mixture and simultaneously devolatilizing the non-polymerizable material therefrom; separately withdrawing the non-polymerizable material until a residual polymer of greater than 98% polymeric material is obtained; and extruding the residual polymeric material from the zone.

6. A process according to claim 2 wherein the compound represented by the general formula is styrene.

7. A process according to claim 2 wherein the compound represented by the general formula is methylstyrene.

8. A process according to claim 2 wherein the compound represented by the general formula is methoxystyrene.

9. A process according to claim 2 wherein the compound represented by the general formula is cyclohexylstyrene.

10. A process according to claim 2 wherein the compound represented by the general formula is a mixture of methylstyrene and α-methylstyrene, the weight ratio of methylstyrene to α-methylstyrene being within the range of from about 3:2 to about 9:1.

References Cited in the file of this patent

UNITED STATES PATENTS

| | | |
|---|---|---|
| 2,350,400 | King | June 6, 1944 |
| 2,530,409 | Stober et al. | Nov. 21, 1950 |
| 2,656,334 | D'Alelio | Oct. 20, 1953 |
| 2,745,824 | Melchore | May 15, 1956 |